United States Patent
Duck et al.

(12) 
(10) Patent No.: US 6,438,291 B1
(45) Date of Patent: Aug. 20, 2002

(54) COUPLING OF LIGHT INTO A MONOLITHIC WAVEGUIDE DEVICE

(75) Inventors: Gary Duck, Nepean; Yihao Cheng, Kanata, both of (CA); Jan Ingenhoff; Norbert Fabricius, both of Waghäusel-Kirrlach (DE)

(73) Assignees: JDS Fitel Inc., Ottawa (CA); Integrierte Optik GmbH, Waghausel-Kirrlach (DE)

( * ) Notice: Subject to any disclaimer, the term of this patent is extended or adjusted under 35 U.S.C. 154(b) by 0 days.

(21) Appl. No.: 09/204,147

(22) Filed: Dec. 3, 1998

(51) Int. Cl.[7] .................................................. G02B 6/32
(52) U.S. Cl. .............................. 385/34; 385/24; 385/31; 385/33; 385/27
(58) Field of Search ......................... 385/24–27, 31–34, 385/37–39

(56) References Cited

U.S. PATENT DOCUMENTS

| | | | |
|---|---|---|---|
| 4,693,544 A | * 9/1987 | Yamasaki et al. | 385/34 |
| 4,878,728 A | 11/1989 | Mannschke | 350/96.17 |
| 5,009,477 A | 4/1991 | Alferness et al. | |
| 5,050,954 A | * 9/1991 | Gardner et al. | 385/33 |
| 5,071,216 A | 12/1991 | Sullivan | 385/34 |
| 5,555,330 A | * 9/1996 | Pan et al. | 385/39 |
| 5,657,155 A | * 8/1997 | Cheng | 385/33 |
| 5,852,505 A | * 12/1998 | Li | 385/24 |
| 6,005,995 A | * 12/1999 | Chen et al. | 385/33 |
| 6,044,187 A | * 3/2000 | Duck et al. | 385/33 |
| 6,055,347 A | * 4/2000 | Li et al. | 385/34 |
| 6,215,924 B1 | * 4/2001 | Hulse et al. | 385/34 |

FOREIGN PATENT DOCUMENTS

| | | |
|---|---|---|
| EP | 0 729 044 A2 | 8/1996 |
| EP | 0 856 764 A2 | 8/1998 |
| GB | 2 315 882 A | 7/1997 |

* cited by examiner

*Primary Examiner*—Frank G. Font
*Assistant Examiner*—Sang H. Nguyen
(74) *Attorney, Agent, or Firm*—Lacasse & Associates, LLC

(57) ABSTRACT

An optical system for coupling light from a monolithic waveguide chip from one optical path to another on different layers of the chip or into or out of the chip along an edge thereof by coupling a GRIN lens to the edge. Coupling a GRIN lens having a reflective end allows light to be launched out of and back into the waveguide chip. Alternatively a GRIN lens having a plurality of fibers coupled thereto can be used to couple signals carried by the fibers into the waveguide chip.

10 Claims, 4 Drawing Sheets

COUPLING OF LIGHT INTO A MONOLITHIC WAVEGUIDE DEVICE

CROSS REFERENCE TO RELATED APPLICATIONS

Not applicable

STATEMENT REGARDING FEDERALLY SPONSORED RESEARCH AND DEVELOPMENT

Not applicable

REFERENCE TO A "MICROFICHE APPENDIX"

Not applicable

BACKGROUND OF THE INVENTION

1. Field of the Invention

This invention relates to the optical coupling of light into and out of a monolithic waveguide device.

2. Description of the Related Art

Waveguide devices having a waveguide disposed on a substrate are well known. Typically these monolithic waveguide devices form various opto-electronic devices (OEDs) ranging from quantum well IR detectors to light sources. The coupling of radiation through the substrate is also possible in OEDs when the substrate is transparent.

One of the more difficult general problems to overcome concerning waveguides relates to efficiently coupling light into and out of these often layered, generally planar structures.

U.S. Pat. No. 5,195,150 in the name of Stegmueller et al., assigned to Siemens Aktiengesellschaft, issued in 1993 relates to the coupling of light into a waveguide disposed on a substrate and including a mirror for reflecting light through the substrate discloses a plano-convex lens being integrated on a surface of the substrate lying opposite the waveguide. This device provides a means of coupling light from an optical fibre to a substrate within the waveguide chip. Although this device performs its intended function, it is very costly to manufacture and difficult to implement.

G.S. Pat. No. 5,447,695 entitled Waveguide-Optical Fiber Connection Structure And Waveguide-Optical Fiber Connection Method, in the name of Yamane Takashi et al, assigned to Fujitsu Limited of Japan, issued Sep. 17, 1996 discloses an improved simplified waveguide-optical fiber connection structure for connecting a waveguide to an optical fiber.

The waveguide-optical fiber connection structure comprises an optical fiber, a waveguide substrate having a waveguide integrally formed thereon and having a first guide groove formed thereon adjacent an end portion of the waveguide for positioning the optical fiber therein, and a fiber substrate provided in an opposing relationship to the first guide groove for cooperating with the first guide groove to hold the optical fiber thereon.

U.S. Pat. No. 5,629,534 issued May 13, 1997, entitled Semiconductor device in the name of Inuzuka Hajime et al., discloses a monolithic photocoupler which is easy to integrate. An SOI structure is formed by providing a first insulation layer on a silicon substrate. The semiconductor single crystal region is further divided by trench insulation layers into separate regions. Light emitting elements are formed on one of the separated semiconductor single crystal region and light receiving elements are formed on the other semiconductor single crystal region. The light emitting elements are obtained by forming light emitting diodes made of GaAs or the like on the substrate using a heterogeneous growth process. An optical waveguide made of a material which is optically transparent and electrically insulative such as a TiO(2) film on each pair of light emitting and light receiving elements.

U.S. Pat. No. 4,455,696 entitled Self-aligned coupling of optical fiber to semiconductor laser or LED in the name of Carney; James K. assigned to Honeywell Inc. issued Aug. 21, 1984 is directed to the self-aligned coupling of the core of an optical fiber to the narrow stripe emitting spot in the active layer of a narrow stripe semiconductor laser. In this invention a V-groove is etched into the same substrate onto which the epitaxial layers for the narrow stripe laser have been grown.

U.S. Pat. No. 4,933,262 entitled method of making integrated optical component, in the name of Beguin; Alain M. J. assigned to Corning Incorporated discloses a method of making an integrated optical component in which a central planar region includes an optical circuit path and a lateral region includes an optical fiber positioning groove in alignment with the path. A glass body having central and lateral regions is coated with a mask material. A photolithographic technique is used to provide the mask material with a patterned opening in the central region corresponding in shape to the circuit path and a patterned opening in the lateral region corresponding to the shape of the alignment groove. A layer of resisting material is applied over the mask on the central region and the lateral region is etched to form the groove. The layer of resisting material is removed, and the zone of the central region that is exposed by the opening in the mask is subjected to an ion exchange process in order to form therein an optical path that is in registration with the fiber positioning groove.

Since many monolithic waveguide devices are merely components in larger optical systems, there is generally one common goal in many of the aforementioned patents; that is, coupling light into and out of monolithic waveguide structures. Although some of these patents are concerned with other aspects, the challenge of efficiently coupling light into and out of these monolithic waveguide structures without unwanted loss, and more particularly from an optical fibre into a planar or near planar waveguide chip remains a goal.

Currently, most technologies that relate to coupling light between an optical fibre and a waveguide chip attempt to provide solutions for enhancing the direct coupling between a fibre end face and an end or side of a waveguide chip. V-grooves and various other means have been employed to assist in the physical coupling of the fibre end face with a face of a waveguide chip, however these methods tend to be costly and difficult to employ.

It is believed that heretofore the combination of monolithic waveguide chips with bulk optics, to provide one or more functions is not known.

Heretofore, providing the well-known functions of filtering, isolating, or circulating, among others, within a monolithic planar waveguide chip has been extremely difficult if not impossible.

In accordance with this invention, hybrid modules are provided that complement the use of planar waveguides by their combination with bulk optics that are provided in a single package.

Advantageously, temperature stabilization can be more easily realized by combining by coupling bulk optics components with planar waveguides.

It is an object of this invention, to provide a new hybrid device that relies on both bulk optics components and at least a waveguide chip to provide useful functionality.

It is an object of the invention, to provide a method and device for relatively efficiently coupling light between one or more optical fibres and a waveguide chip.

It is an object of the invention to provide a means of relatively efficiently guiding light from one direction within a monolithic waveguide to another relatively opposite direction within the waveguide.

It is an object of the invention to provide a means of relatively and efficiently guiding light for a first direction in a first layer within a monolithic waveguide to layer in a substantially opposite direction by using a GRIN lens.

BRIEF SUMMARY OF THE INVENTION

In accordance with the invention, there is provided, a hybrid light guiding system comprising:

- a monolithic (planar) waveguide device having a light transmitting path therein extending to an end face thereof; and,
- a GRIN lens system having a first end face thereof optically coupled with an optical fibre, and a second end face thereof optically coupled with the light transmitting path at the end face of the monolithic waveguide device.

In accordance with the invention, there is further provided, a hybrid light guiding system comprising:

- a monolithic (planar) waveguide device having a first and second light transmitting path spaced apart a distance $d_1$ therein extending to an end face of the waveguide; and,
- a first GRIN lens system having a first end face thereof optically coupled with the light transmitting paths at the end face of the monolithic waveguide device, the first GRIN lens system for receiving light from one of the first and second light transmitting paths and having a highly reflective second end face for reflecting backwards along the other of the first and second paths, for providing a reversal in direction of light launched into the waveguide along one of the first and second paths.

Advantageously, this invention provides an inexpensive, simple method of coupling light from an optical fibre to a planar waveguide device having light transmissive waveguiding paths therein. Furthermore, this invention obviates the need for complex integration of certain functions into a planar waveguide device by combining the functionality of bulk optics components with planar waveguide chip technology.

BRIEF DESCRIPTION OF THE SEVERAL VIEWS OF THE DRAWINGS

Exemplary embodiments of the invention will now be described in conjunction with the drawings in which.

DETAILED DESCRIPTION OF THE INVENTION

The term "GRIN lens system" shall be understood hereafter as being a lens system comprising one or more GRIN lenses that may be optically coupled having another optical element therebetween.

Figure 1:
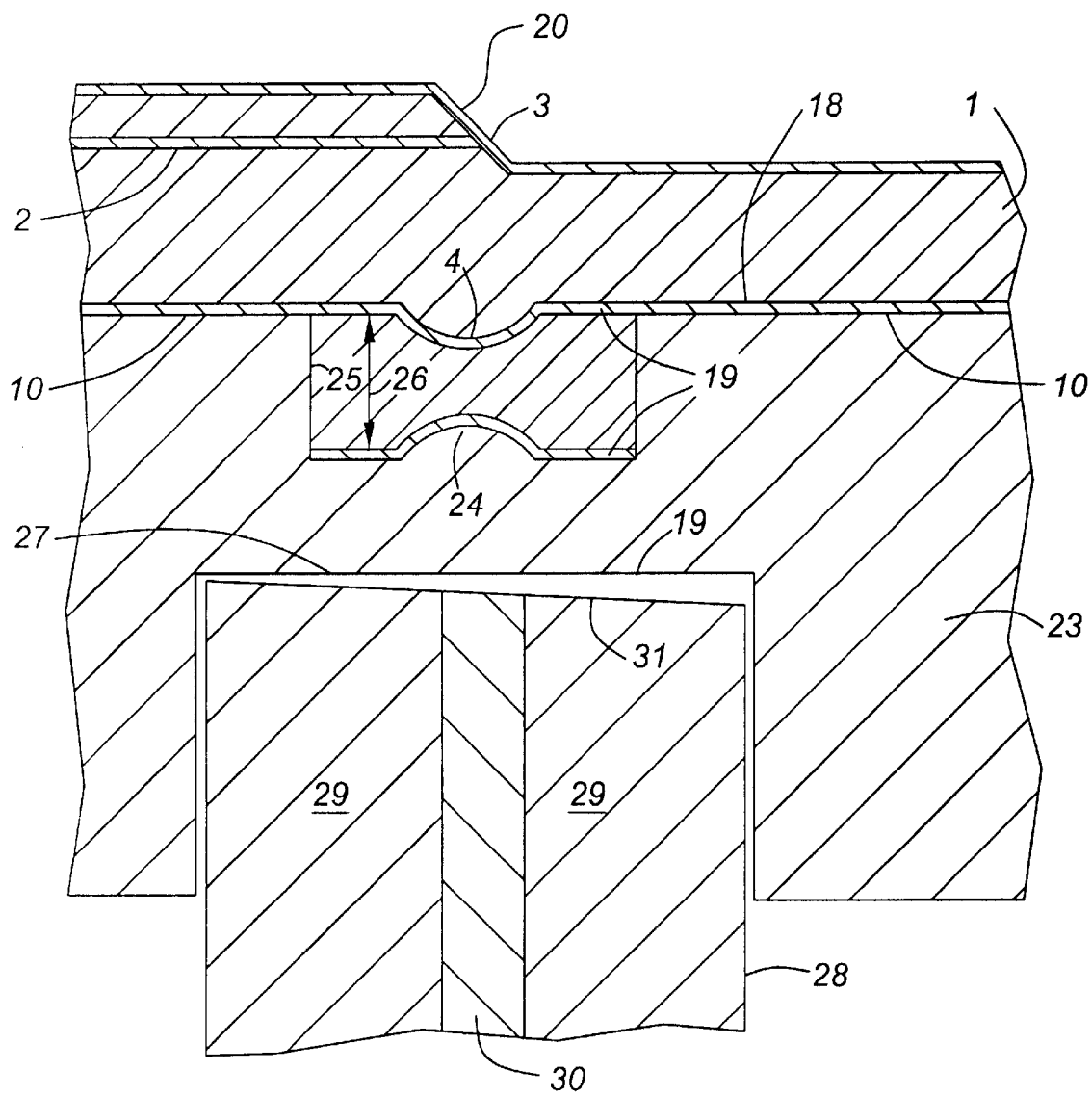
FIG. 1 is a schematic diagram of a prior art coupling structure.

Referring now to prior art FIG. 1, U.S. Pat. No. 5,195,150 discloses a structure wherein an optical fibre 28 whose end face can be perpendicular or oblique, visa-vis the beam direction, can be fitted onto the substrate 23. A lens is provided in a recess 25 of a second substrate 23. A depth 2 of the recess 25 is dimensioned adequately large for the presence of both a lens 4 for the substrate 1 and the lens 24 of the second substrate 23.

Figure 2:
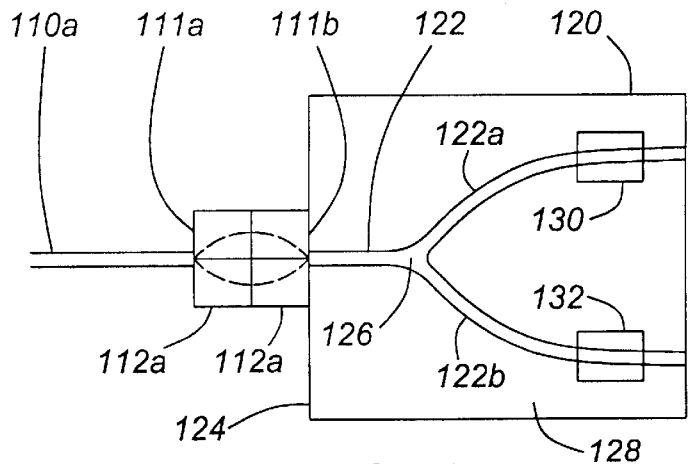
FIG. 2 is a schematic diagram of an embodiment of a coupling structure in accordance with the instant invention.

In contrast, FIG. 2, in accordance with this invention, illustrates a means of coupling light from a first optical fibre 110a to a monolithic waveguide chip 120 having, for example, a splitter therein. A guided light transmitting path 122 extends to an end face 124 of the waveguide chip 120. The splitter divides the guided light transmitting path 122 into first 122a and second branches 122b. Preferably, the waveguide chip 120 includes plurality of regions including a first region 126 that defines the guided light transmitting path 122 and a second region 128 having a refractive index that is lower than the first region 126, for confining a beam of light launched into the guided light transmitting path 122 to said path. The waveguide chip 120 has additional functionality fabricated therein shown by blocks 130 and 132, which may be any integrated optical components such as detectors.

In accordance with this invention, a GRIN lens system in the form of a pair of substantially quarter pitch graded index (GRIN) lenses 112a are used for coupling light from the optical fibre 110a into the waveguide chip 120. In particular, a first end face 111a of the GRIN lens system is optically coupled to the optical fibre 110a, while a second end face 111b is optically coupled to the guided light transmitting path at the end face 124 of the waveguide chip 120. This unusual combination of bulk optics with integrated waveguide technology provides an inexpensive efficient coupling of light from one medium to the other.

Figure 3:
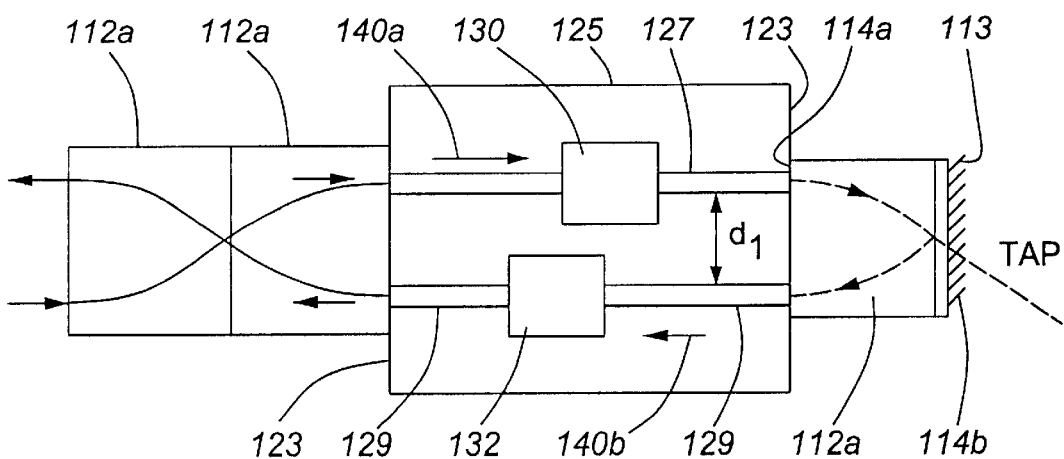
FIG. 3 is a schematic diagram of an embodiment of a coupling structure having a substantially reflective end, in accordance with the instant invention.

Referring now to FIG. 3, a monolithic waveguide chip 125 having integrated optical components 130 and 132 is shown in a novel arrangement wherein input light is launched into the device via a GRIN lens system in the form of back-to-back substantially quarter pitch GRIN lenses 112a (or alternatively a half pitch lens). The waveguide chip 125 includes at least two channel waveguides 127 and 129 separated by a predetermined distance $d_1$ extending to an end face 123 of the waveguide chip 125.

At the other end of the waveguide chip 125 a GRIN lens system in the form of a quarter pitch GRIN lens 112a having an at least partially reflective surface 113 is provided. For example, the GRIN lens system is shown including a first end face 114a optically coupled with the light transmitting paths 127 and 129 at the end face 123 of the monolithic waveguide device, and a highly reflective second end face 114b for reflecting backwards along the other of the first and second paths. Preferably, the quarter pitch GRIN lens 112a has a diameter greater than the predetermined distance $d_1$.

Preferably, the at least partially reflective surface is a coating providing a substantially reflective end 113 allowing only 5% of the light incident upon it to pass therethrough for returning the input light propagating in a direction of the arrow 140a, into the waveguide chip 125, so that is will propagate in a reverse direction shown by arrow 140b, substantially parallel to the input light.

This functionality is extremely difficult to achieve within the monolithic waveguide chip 125. Conveniently, the GRIN lens 112a serves as a means of coupling light out of and into an end of the waveguide chip 125, and furthermore, in this instance, provides the functionality of reversing the direction of the beam of light along a parallel path. 5% of light leaking through the reflective end face of the GRIN lens 112a is used as a monitor tap by placing a detector (not shown) in the path of the light. This arrangement is also useful for directing light from one waveguide layer to another, wherein the GRIN lens 112a spans two spaced light transmissive layers having a least a cladding layer between, within the device 125.

Blocks 130 and 132 comprise circuitry fabricated within the device 125, operating on the light passing therethrough. Heretofore, lenses and mirrors designed into a waveguide chip, as shown in prior art FIG. 1, provided difficult solutions to having light enter a monolithic waveguide chip from an optical fibre, having light change direction within a waveguide chip or alternatively routing a beam from one waveguide layer to another within a multilayer waveguide chip.

Figure 4:
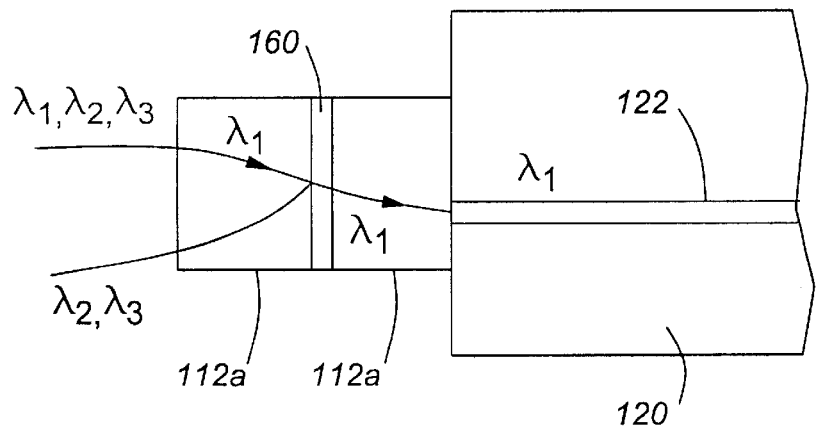
FIG. 4 is a schematic diagram of an embodiment of a coupling structure including a bandpass filter placed between back-to-back GRIN lenses in accordance with the instant invention.

It is well known to place an optical filter between two back-to-back GRIN lenses. However, using this known lensing arrangement in combination with bulk optics and a monolithic waveguide chip to obtain functionality dependent upon their combination is novel and provides significant advantages. For example, FIG. 4 shows an alternative embodiment of this invention, wherein a bandpass optical filter 160 is placed between back-to-back GRIN lenses 112a, and wherein the lenses 112a serve to couple light into the monolithic waveguide chip 120; the filter 160 allows a wavelength band of light centered about the wavelength $\lambda 1$ to pass through while reflecting other wavelengths $\lambda 2$ and $\lambda 3$.

Figure 5:
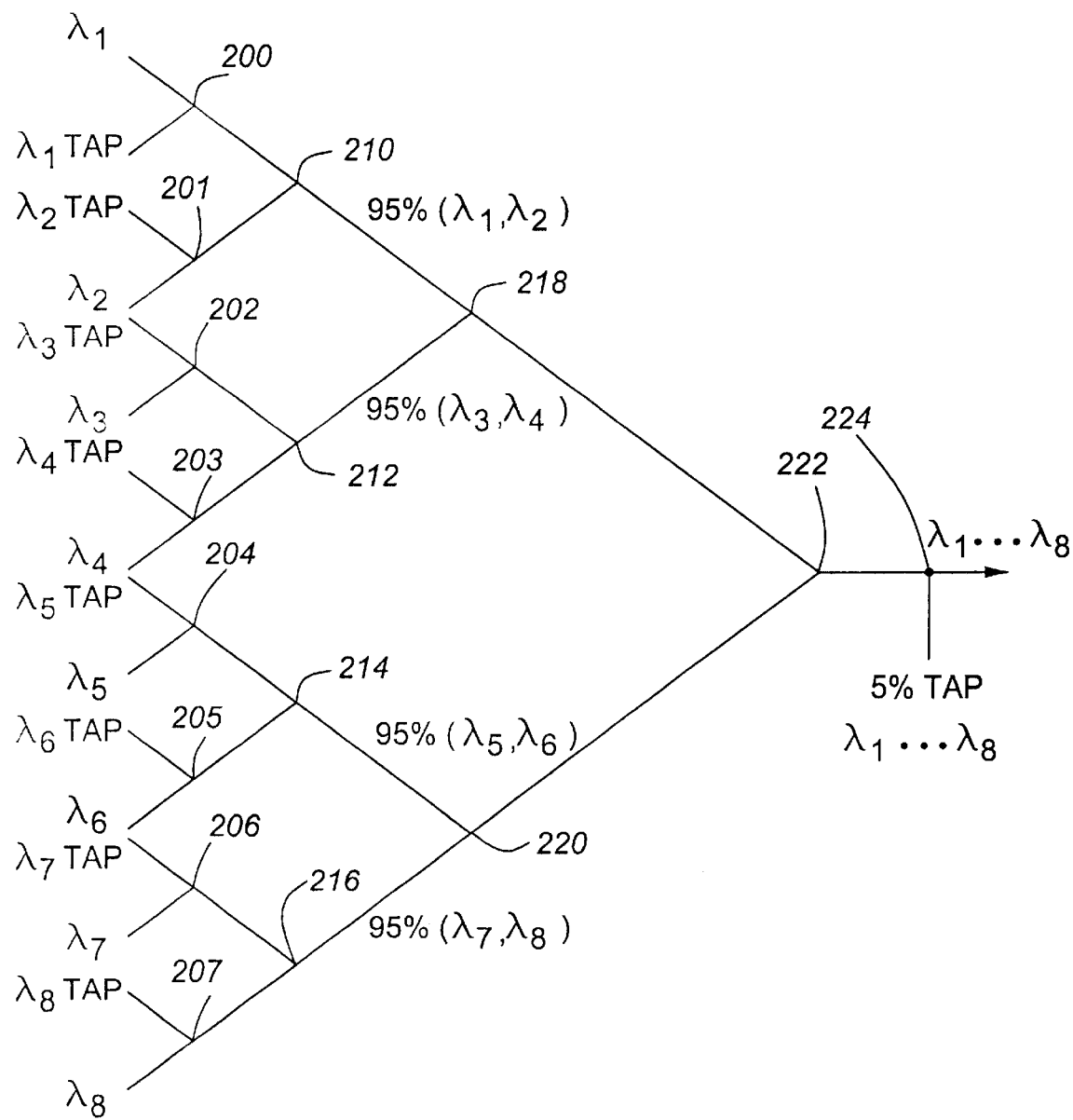
FIG. 5 is a functional schematic diagram of a multiplexer.

In optical circuits designed for communications, it is often required to tap some signal light from certain or all channels in order to monitor and or verify the integrity of the signal, or merely the presence of one or more signals. FIG. 5 shows a functional schematic diagram of an 8:1 multiplexor having taps near each input port and having a tap at the single output port. At every junction where signals are combined 210, 212, 214, 216, 218, 220, and 222, some energy loss is present and the signals are attenuated. Furthermore, some unwanted signal loss occurs at each tap 200, . . . 207 and 224, where light is coupled out.

Figure 6:
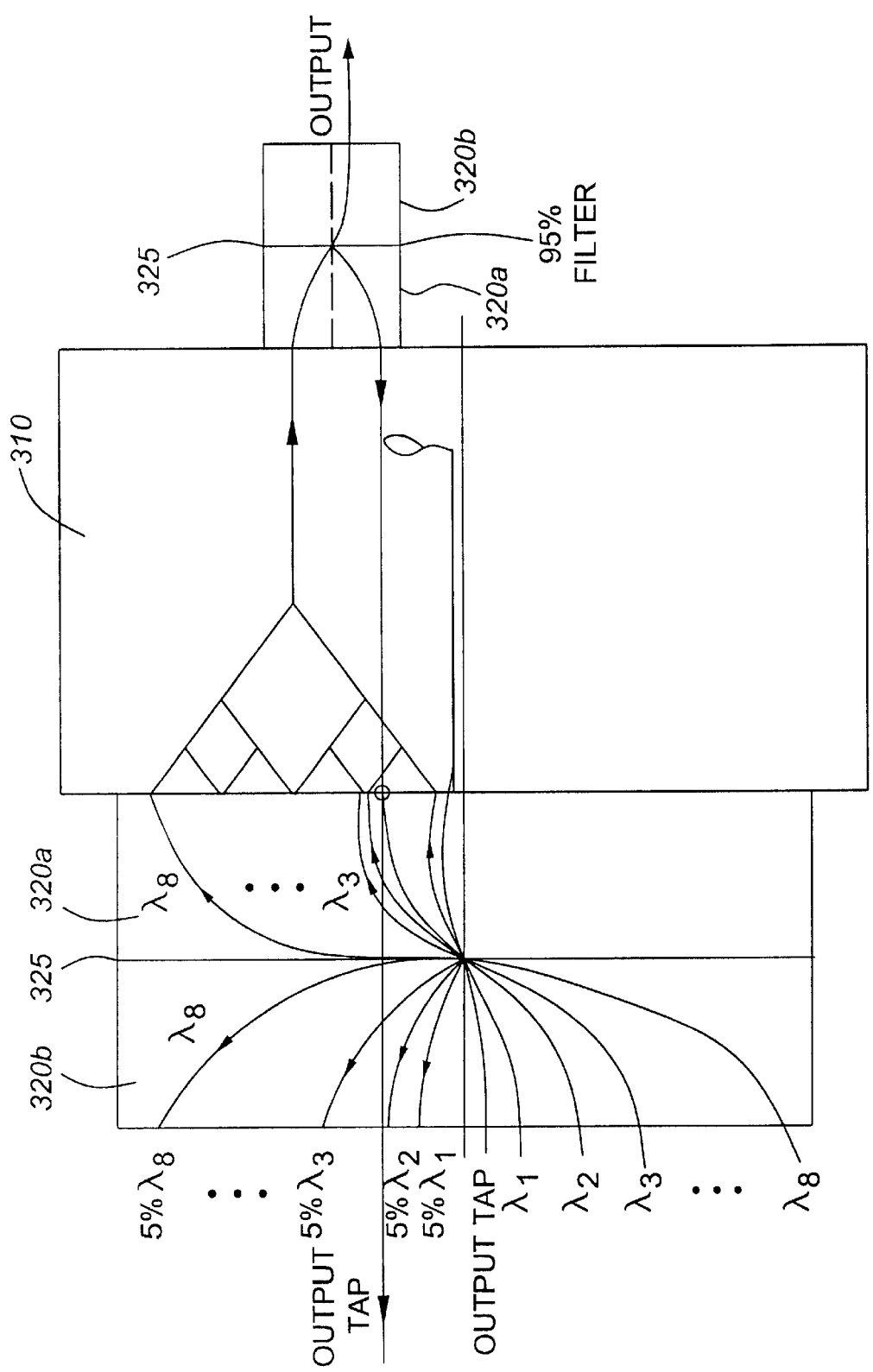
FIG. 6 is a schematic diagram of an embodiment of a coupling structure in accordance with the instant invention for multiplexing a plurality of optical signals.

FIG. 6 illustrates an embodiment of the invention that is less expensive to manufacture and wherein unwanted signal loss is reduced. A monolithic waveguide chip 310 is designed to couple with 8 input signals (or channels) and to multiplex these signals on a single output waveguide within the device. Two back-to-back GRIN lenses 320b and 320a having a dichroic filter element 325 disposed therebetween are coupled to the device 310 such that input fibers optically coupled to an input end of the GRIN lens 320b are optically aligned within corresponding input waveguide ports at the edge of the monolithic waveguide chip 310. The dichroic filter element 325 is designed to pass 95% of the light energy of the wavelengths $\lambda 1$ to $\lambda 8$ incident thereupon, and to reflect 5% of the light to tap ports at the input end face of the lens 320b. One or more fiber tubes not shown may be used to physically couple the fibers to the GRIN lens 320b.

Optionally, and as is shown in FIG. 6 a second pair of back-to-back GRIN lenses 320a and 320b having a filter element 325 coupled therebetween is provided for reflecting backwards 5% of light incident upon it and for passing 95% of the light to an output port. 5% of reflected light is shown to be routed via a waveguide to the input end.

Of course, numerous other embodiments may be envisaged without departing from the spirit and scope of the invention.

What is claimed is:

1. A hybrid light guiding system comprising:
a monolithic waveguide device having at least two channel waveguides therein, the guided light transmitting paths that extend to an end face of the monolithic waveguide device and are separated by a predetermined distance $d_1$ at the end face of the monolithic waveguide device; and
a GRIN lens having a first end face thereof optically coupled with an optical fibre, and a second end face thereof optically coupled with the at least two channel waveguides at the end face of the monolithic waveguide devices whereby the at least two channel waveguides are coupled to a common end face of the GRIN lens.

2. The hybrid light guiding system as defined in claim 1, wherein the monolithic waveguide device is planar.

3. The hybrid device as defined in claim 1 wherein the at least two channel waveguides are substantially equidistant from an optical axis of the GRIN lens.

4. The hybrid device as defined in claim 3, wherein the first end face of the GRIN lens is optically coupled with at least two optical fibers.

5. The hybrid device as defined in claim 4, wherein the at least two optical fibres are optically coupled with the at least two channel waveguides.

6. The hybrid device as defined in claim 1 wherein the second end face of the GRIN lens has a diameter greater than the predetermined distance $d_1$.

7. The hybrid device as defined in claim 1 wherein the GRIN lens comprises two axially arranged, back-to-back GRIN lenses.

8. A hybrid light guiding system comprising:
a monolithic waveguide device having a first and a second light transmitting path spaced apart a distance $d_1$ therein extending to an end face of the waveguide device; and,
a first GRIN lens system having a first end face thereof optically coupled with the first and second light transmitting paths at the end face of the monolithic waveguide device, the first GRIN lens system for receiving light from the first light transmitting path and having a highly reflective second end face for reflecting the light along the second path, for providing a reversal in direction of light launched into the monolithic waveguide device along the first path.

9. A hybrid light guiding system as defined in claim 8 including a second GRIN lens system having a first end face thereof optically coupled with an optical fibre, and a second end face thereof optically coupled with at least one of the light transmitting paths at an end face of the monolithic waveguide device.

10. A hybrid light guiding system as defined in claim 9, wherein the second GRIN lens system is coupled with a different end face of the monolithic waveguide device than the first GRIN lens system.

* * * * *

UNITED STATES PATENT AND TRADEMARK OFFICE
CERTIFICATE OF CORRECTION

PATENT NO. : 6,438,291 B1
DATED : August 20, 2002
INVENTOR(S) : Duck et al.

It is certified that error appears in the above-identified patent and that said Letters Patent is hereby corrected as shown below:

Column 6,
Line 13, "guided light transmitting paths" should read -- channel waveguides --

Signed and Sealed this

Fifth Day of November, 2002

Attest:

JAMES E. ROGAN
Attesting Officer
Director of the United States Patent and Trademark Office